United States Patent
Winarski et al.

(10) Patent No.: US 6,771,456 B2
(45) Date of Patent: Aug. 3, 2004

(54) SYSTEM AND METHOD FOR MINIATURIZATION OF READ/WRITE HEADS

(75) Inventors: Daniel James Winarski, Tucson, AZ (US); George G. Zamora, Vail, AZ (US)

(73) Assignee: International Business Machines Corporation, Armond, NY (US)

( * ) Notice: Subject to any disclaimer, the term of this patent is extended or adjusted under 35 U.S.C. 154(b) by 347 days.

(21) Appl. No.: 09/870,898

(22) Filed: May 31, 2001

(65) Prior Publication Data

US 2002/0181143 A1 Dec. 5, 2002

(51) Int. Cl.$^7$ ............................................... G11B 5/55
(52) U.S. Cl. ................................................. 360/78.02
(58) Field of Search ............................... 360/78.02, 75, 360/72.2, 77.12, 77.16, 261.3, 291.9, 291, 78.12

(56) References Cited

U.S. PATENT DOCUMENTS

| | | | |
|---|---|---|---|
| 3,924,268 A | 12/1975 | McIntosh et al. | 360/78 |
| 4,685,005 A | 8/1987 | Fields, Jr. | 360/53 |
| 4,914,725 A | 4/1990 | Belser et al. | 318/560 |
| 5,060,210 A | 10/1991 | Fennema et al. | 369/32 |
| 5,153,785 A * | 10/1992 | Muranushi et al. | 360/75 |
| 5,280,402 A * | 1/1994 | Anderson et al. | 360/261.3 |
| 5,377,052 A | 12/1994 | Guzman et al. | 360/106 |
| 5,379,170 A * | 1/1995 | Schwarz | 360/291 |
| 5,423,207 A * | 6/1995 | Flechsig et al. | 73/104 |
| 5,432,652 A | 7/1995 | Comeaux et al. | 360/77.12 |
| 5,457,585 A | 10/1995 | Christensen | 360/75 |
| 5,471,352 A * | 11/1995 | Fujita et al. | 360/72.2 |
| 5,689,384 A | 11/1997 | Albrecht et al. | 360/77.12 |
| 5,768,226 A | 6/1998 | Ogino | 369/44.28 |
| 5,828,523 A * | 10/1998 | Takeuchi et al. | 360/291.7 |
| 5,905,613 A | 5/1999 | Biskeborn et al. | 360/130.21 |
| 5,923,272 A | 7/1999 | Albrecht et al. | 341/55 |
| 5,930,065 A | 7/1999 | Albrecht et al. | 360/72.2 |
| 5,982,711 A * | 11/1999 | Knowles et al. | 360/77.12 |
| 6,021,013 A | 2/2000 | Albrecht et al. | 360/53 |
| 6,043,957 A | 3/2000 | Hattori et al. | 360/106 |
| 6,104,578 A * | 8/2000 | Kitazaki et al. | 360/135 |
| 6,115,204 A * | 9/2000 | Yokomachi et al. | 360/77.16 |
| 6,122,147 A * | 9/2000 | Fahimi et al. | 360/221 |
| 6,246,552 B1 * | 6/2001 | Soeno et al. | 360/294.4 |
| 6,356,524 B2 * | 3/2002 | Aratani | 369/126 |
| 6,522,506 B1 * | 2/2003 | Ozue | 360/291.9 |
| 6,580,581 B1 * | 6/2003 | Bui et al. | 360/78.02 |
| 6,587,303 B1 * | 7/2003 | Bui et al. | 360/78.12 |

* cited by examiner

*Primary Examiner*—David Hudspeth
*Assistant Examiner*—Fred F. Tzeng
(74) *Attorney, Agent, or Firm*—Allen K. Bates

(57) ABSTRACT

A magnetic head is disclosed that utilizes MEMS technology to form microsliders and micromotors to provide fine movement of read, write and/or servo heads. In one exemplary embodiment, the head block includes cavities in which the microsliders are movably disposed. Read, write and/or servo elements are disposed on the microsliders. In other exemplary embodiments, the microsliders are disposed on the body block. Micromotors are mechanically coupled to the microsliders to move the microsliders with respect to the head body. Exemplary control systems include a controller that receives independent fine position data of the microslider and controls the micromotors to move the microsliders into a desired position.

25 Claims, 3 Drawing Sheets

SYSTEM AND METHOD FOR MINIATURIZATION OF READ/WRITE HEADS

FIELD OF THE INVENTION

The present invention relates to systems and methods for the miniaturization of read/write heads. More particularly, the present invention relates to systems and methods for miniaturizing tape heads using micro-electromechanical systems (MEMS). Particular utility for the present invention is in the design and method of use of tape heads, although other utilities are contemplated herein, for example, hard disk drive heads and floppy disk drive heads, and/or other read/write media using read/write heads.

BACKGROUND OF THE INVENTION

Current tape head technology has considerably changed from the early wire-wound read-write elements. Today's magnetic tape heads have thin-film write elements and magneto-resistive read elements. Future tape heads may replace the magneto-resistive read elements with giant magneto-resistive, sometimes called spin-valve, read elements. Far into the future, tape heads may have tunnel junction read elements for reading magnetic tape or may even have laser read and write elements for performing I/O on optical tape.

Regardless of the technology to read and write data, tape heads are typically built to provide read-after-write. Read-after-write means that the data is read-verified after it is written, to check for write errors. Since write errors are the most difficult to correct, immediately checking for write errors via a read-verification enhances the reliability of the tape drive. This read-after-write is provided by a tape head by having each read element (a) be in-line, rather than side-by-side, with the respective write element and (b) the read element be behind the respective write element according to the direction that the tape is moving across the tape head.

Up until now, tape heads have typically been built using read and write elements photolithographed onto ferrite modules and these modules fixedly assembled into the tape head. No motion of the read and write elements within the tape head was permitted. Air bleed slots were typically formed in the outer surface of the ferrite modules, so that the boundary layer of air between the moving tape and the read and write elements could be bled off. Bleeding off this boundary layer of air is critical to keeping the tape in close proximity with the read and write elements on the tape head.

In the IBM 3420 and 3480 tape drives, the assembled tape head was aligned with respect to tape guides and fixedly held in place in the tape drive. Since the tape head was fixedly held in place, the IBM 3420 and 3480 magnetic tape did not have servo tracks. Eventually this static positioning of the tape head gave way to articulated tape heads, such as used in the IBM 3590 tape drive and taught in U.S. Pat. No. 5,377,052; which is hereby incorporated by reference. Via a parallelogram support, the tape head in the IBM 3590 tape drive was moved perpendicular to the direction of travel of the magnetic tape. The magnetic tape used in the IBM 3590 tape drive now had longitudinal servo tracks, as taught in U.S. Pat. No. 5,432,652; which is also hereby incorporated by reference. Using servo read elements on the tape head, the tape drive read the position of the tape head relative to the factory written servo tracks and adjusted the position of the tape head to optimize I/O.

The tape heads used in the IBM 3420, 3480, and 3590 tended to be somewhat large in size. Later tape drives, such as IBM's Linear Tape Open, used a lead screw as a coarse actuator and a magnetically activated flexible beam as a fine actuator. Both the coarse and the fine actuators move the now much smaller tape head perpendicular to the direction that the tape was moving. The coarse actuator moved the tape head large distances so that the head could access all recording regions on the tape. The fine actuator, which rode on top of the coarse actuator, moved the tape head small but accurately controlled distances, so that the head could dynamically follow the motion of the tape. Improvements to the servo tracks written to the magnetic tape used in the Linear Tape Open drive, IBM's Timing Based Servo, are taught in U.S. Pat. No. 5,689,384, which is hereby incorporated by reference. These improvements to tape drives, tape heads, and tape itself greatly increased the data capacity and reliability of tape data storage.

SUMMARY OF THE INVENTION

Improvement in tape technology was needed to obtain yet further gains in data capacity and reliability. Further reduction of the mass of the tape head was needed in order to enhance the dynamic responsiveness of the fine actuator mechanism so that the tape head can better track the motion of the moving tape, thus improving the data capacity and reliability of the tape drive. This need for improvement has culminated with MEMS technology to move the I/O elements themselves as a fine actuator mechanism. The read and write elements are now placed on microsliders, which are dynamically moved perpendicular to the motion of the tape by micromotors. The motion of the microsliders is constrained by walls in the ferrite core or head block.

Servo read elements on the microsliders feed positional information to the tape drive. The tape drive continually looks at the error term between the actual position and the desired position of the microsliders, based on the reading of servo tracks which have been factory written on the tape itself. The tape drive then activates micromotors to move the microsliders in order that the data read and write elements follow the lateral motion of the tape. Thus, the data read and write elements remain centered over the desired data tracks as I/O is performed between the tape drive and the tape. The coarse actuator, intended to move the tape head to new areas of the tape, continues to move the entire tape head as needed.

In one exemplary embodiment, the present invention provides a tape head that includes a body portion comprising a cavity, a microslider movably disposed in the cavity comprising at least one read element disposed thereon, and a controllable micromotor coupled to the microslider for moving the microslider in the cavity.

Other exemplary embodiments include a control system for actuating the micromotor to cause the microslider to move with respect to the body cavity.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
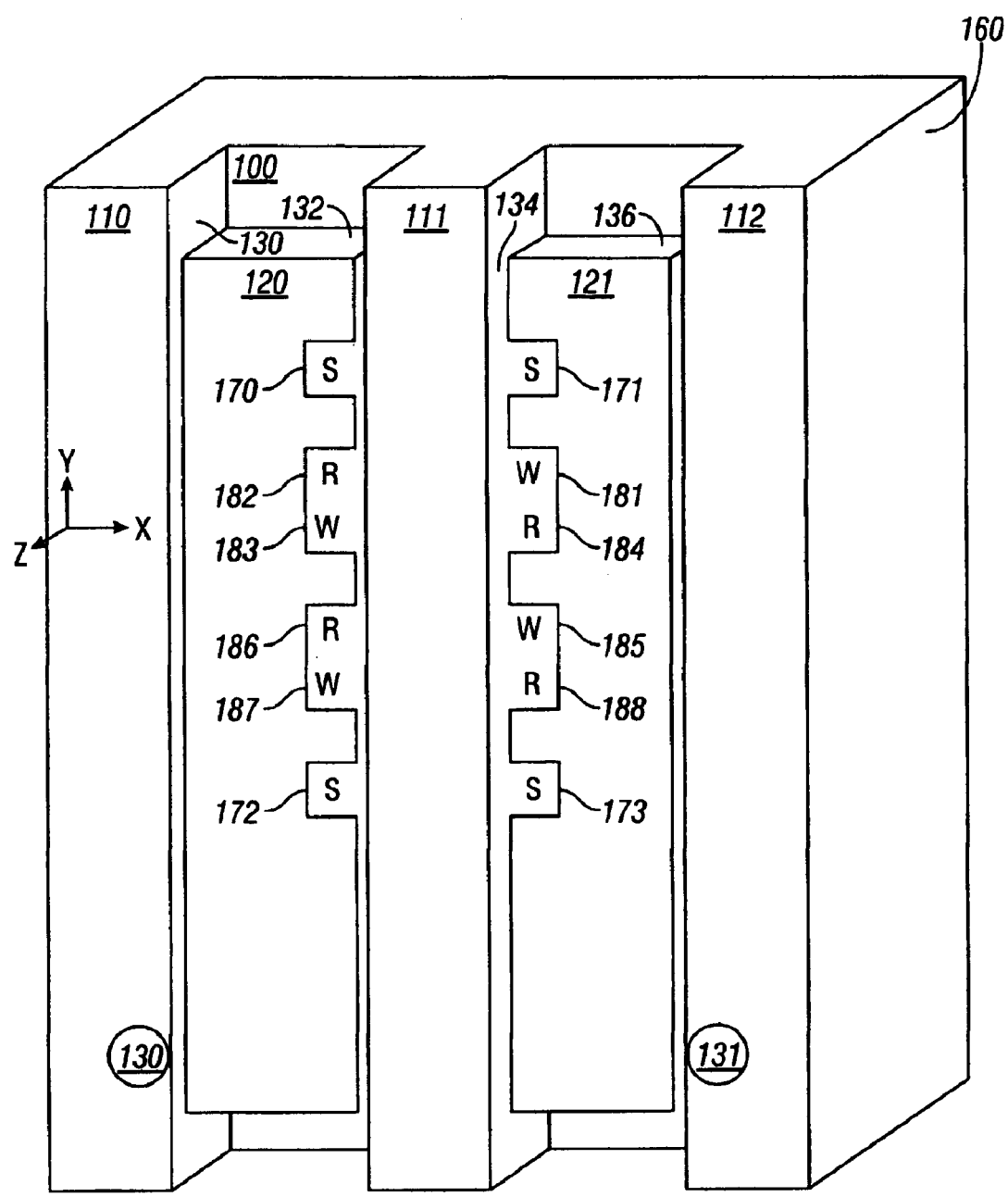
FIG. 1 depicts a tape head employing MEMS technology according to one exemplary embodiment of the present invention.

FIG. 1 depicts a MEMS tape head 100 according to one exemplary embodiment of the present invention. Magnetic or optical tape moves across the head 100 along the +/−X direction. The tape head 100 comprises microsliders 120 and 121 that are articulated in the +/−Y direction, which is considered the transverse or lateral direction relative to the direction in which the tape moves across head 100. Microsliders 120 and 121 are constrained in the X direction by walls 110, 111 and 112, as depicted. Movement of microsliders 120 and 121 is provided by controllable micromotors 130 and 131, respectively. Micromotors are disposed in the walls, as shown, and are in mechanical contact with the microsliders, preferably in a rack and pinion relationship. Alternatively, the micromotors could be above or below the microsliders, or disposed underneath the microsliders. At the outset, the microsliders provide "fine" position movement of the head elements (e.g., read, write, servo) with respect to the tape. "Coarse" position movement along the +/−Y direction is provided in a conventional manner, i.e., by moving the entire head body block 160. "Fine," as used herein means movement of the microsliders along the +/−Y direction with greater resolution and faster dynamic response than the smallest incremental "coarse" movement, and will be described herein with reference to movement of the microsliders. Likewise, "coarse" as used herein means movement outside the range of the "fine" movement range, and will generally be described herein with reference to movement of the entire head. Of course, overlap could exist between fine and coarse position movement, and the present invention is intended to cover a range of fine and coarse movement.

Dynamically responsive fine seek capability is provided by microsliders 120 and 121, due to their inherently low mass. As is depicted, microsliders 120 and 121 include the servo read elements (S) 170–173; the data write elements (W) 181, 183, 185, 187; and the data read elements (R) 182, 184, 186, and 188. In the exemplary embodiment the head module 100 includes a plurality of read/write elements 181–188 for data input and output. Single element read heads may be used for the servo elements 170–173. The quantity of read/write elements per microslider will typically be a function of the quantity of grouped data tracks per module desired. The read, write, and servo elements can be attached to the microsliders 120 or 121 using adhesive or epoxy, or photolithographed directly to the microsliders, in a manner well understood in this art. To achieve economy of scale, the same design of microslider may be used for different quantity of tracks per module and each read/write head can be tested prior to installation between walls 110, 111 and 112.

To permit bi-directional tape flow and write and read-verify operation, a read head on slider 120 is positioned in line, along the X axis, relative to a write head on slider 121. For example, when the tape is moving in the +X direction, write elements 183 and 187 would write data and read element 184 and 188, respectively would read-verify that data. Then, when the tape is moving in the −X direction, write elements 181 and 185 would write data and read element 182 and 186, respectively would read-verify that data. As a general statement, the read and write elements on sliders 120 and 121 are disposed in an alternating fashion, as shown in FIG. 1. To provide for manufacturing tolerances, the exemplary head of FIG. 1 includes a predetermined gap 130, 132 and 134, 136 on either side of the microsliders 120 and 121, respectively, so that manufacturing variances within a predetermined tolerance of the microsliders 120 and/or 121 and/or walls 110, 111 or 112 will not cause sticking or friction between the walls and the microslider during articulation in the +/−Y direction. Polytetrafluoroethylene, which is commonly known by the trade name TEFLON, could be used in gaps 130, 132 and 134, 136 to lessen friction between microsliders 120 and 121 and walls 110–112 as well as head body 160. It should be noted that the paired read and write elements could be on the same microslider, rather than on separate microsliders. Separate microsliders are shown as the preferred embodiment in FIG. 1 as one way of reducing manufacturing costs and allowing for a more dynamically articulated system.

Microsliders 120–121 are disposed generally parallel to one another, and are arranged so that corresponding read/write elements are aligned. The present invention contemplates that microsliders 120–121 need not be exactly parallel, but may be arranged other than in parallel alignment provided that the read, write and/or servo processes are not hindered significantly.

Figure 2:
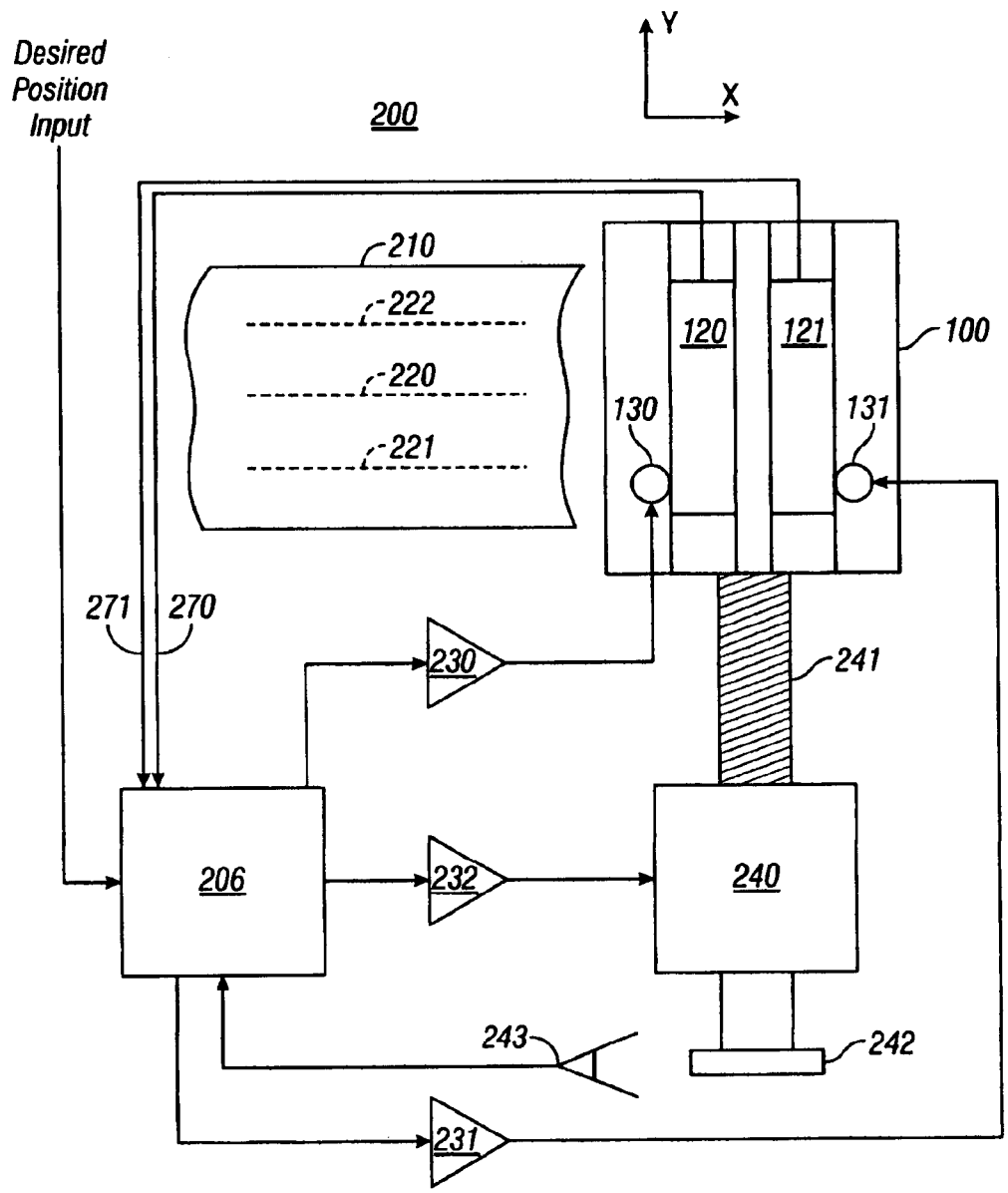
FIG. 2 depicts a system level diagram for controlling the tape head of FIG. 1.

FIG. 2 depicts a system-level diagram of an exemplary closed-loop control system for motion control of the tape head of the present invention. Control system 200 uses controller 206 for gathering actual positional information, comparing that to the desired position, and effecting necessary coarse and fine positional changes along the +/−Y direction of head 100 to permit data I/O. Controller 206 may be a standard microprocessor with microcode instructions stored either inside the controller 206 or in a separate EPROM, which is not shown. Based on the difference between the actual position of head 100 and the desired position of head 100, controller 206 supplies low-level coarse position signals to power amplifier 232, which amplifies those coarse position signals into sufficient voltage and amperage to turn lead-screw motor 240. Lead screw motor 240 turns coarse position lead screw 241, which is directly connected to head 100. As lead screw 241 is turned by lead screw motor 240, the elevation or position of head 100 along the +/−Y axis is changed. Control system 200 includes a rotary digital tachometer 242 attached to lead screw motor 240 that is read by optical sensor 243. Thus, optical sensor 243 reads coarse position motion of lead screw 241, as turned by lead screw motor 240. Controller 206, having been programmed to know the pitch of lead screw 241, then knows the elevation of head 100 by the number of turns and fraction thereof made by lead screw 241. Thus, the coarse position is a closed loop servo system. Alternatives to lead screw motor 240 and lead screw 241 could include an electromagnet. However, the lead screw motor and lead screw comprise the preferred embodiment for the coarse position control loop.

Control system 200 also includes an independent fine position control for each individual microsliders 120 and 121, to adjust the relative position of the microsliders relative to head body 160 in the Y direction with respect to tape 210. Tape 210 has one or more servo tracks 220 and one or more groups of data tracks 221–222. Controller 206 receives servo positional information from servo read elements 170 or 172 on microslider 120 and servo read elements 171 or 173 on microslider 121. In regards to servo track 220, servo elements 170 and 171 would be used to control microsliders 120 and 121 for performing I/O on data track group 221, which is below servo track 220. Similarly, servo elements 172 and 173 would be used to control microsliders 120 and 121 for performing I/O on data track group 222, which is above servo track 220. Thus, one servo track can be used to provide positional information to controller 206 for more than one group of data tracks.

Controller 206 receives the servo positional information from microslider 120 via head cable 270 and from microslider 121 via head cable 271. These head cables are short, to prevent capacitive and inductive properties of the head cables from distorting the positional information. Also, these head cables are flexible to allow unencumbered motion of microsliders 120 and 121. Finally, head cables 270–271 also carry data I/O information.

Controller 206 compares the actual position of microsliders 120 and 121 relative to the target servo track and compares that to the desired position. Controller 206 uses this comparison to correct the positions of microsliders 120 and 121 by sending signals to power amplifiers 230 and 231. Power amplifiers 230 and 231 amplify the low level signals from controller 206 into sufficient voltage and amperage to activate micromotors 130 and 131, respectively. Micromotors 130 and 131 then move microsliders 120 and 121 to the desired position. Thus, there is a closed loop fine position control for each microslider on head 100.

The coarse position closed loop and each fine position closed loop are independent. However, each closed-loop can operate simultaneously, to position the read and write elements 181–188 over the desired groups of data tracks 221–222.

Servo track 220 in FIG. 2 is preferably that described by IBM's timing based servo family of U.S. Pat. Nos. 5,689,384; 5,923,272; 5,930,065; and 6,021,013; all of which are all hereby incorporated by reference in their entirety. U.S. Pat. No. 5,930,065 teaches longitudinal (X direction) positional information included along with the information for lateral (Y direction) serving. This information, read by servo elements 170–173, identifies the regions of the tape that read and write elements 181–188 of head 100 are over. This information, which is factory written to the tape, could be used to compliment the coarse positioning of head 100, or even eliminate digital tachometer 242 and its reader 243 from the coarse position control loop.

The alignment of the read and write elements in FIG. 1 is similar to that taught in U.S. Pat. No. 4,685,005; which is also incorporated by reference. The coarse position control loop in FIG. 2 may be initially calibrated to the edge of tape by use of U.S. Pat. No. 5,457,585; which is also incorporated by reference. Finally, in FIG. 2, there may be a plurality of servo tracks, each used to provide positional information to groups of data tracks in their immediate vicinity. Typically, all servo tracks are precisely written on the tape via dedicated servo writers in the tape manufacturing facility, before the tape is shipped to the customer. This way, the servo tracks are uniformly written so that tape cartridge interchange can freely occur between compatible tape drives.

Figure 3:
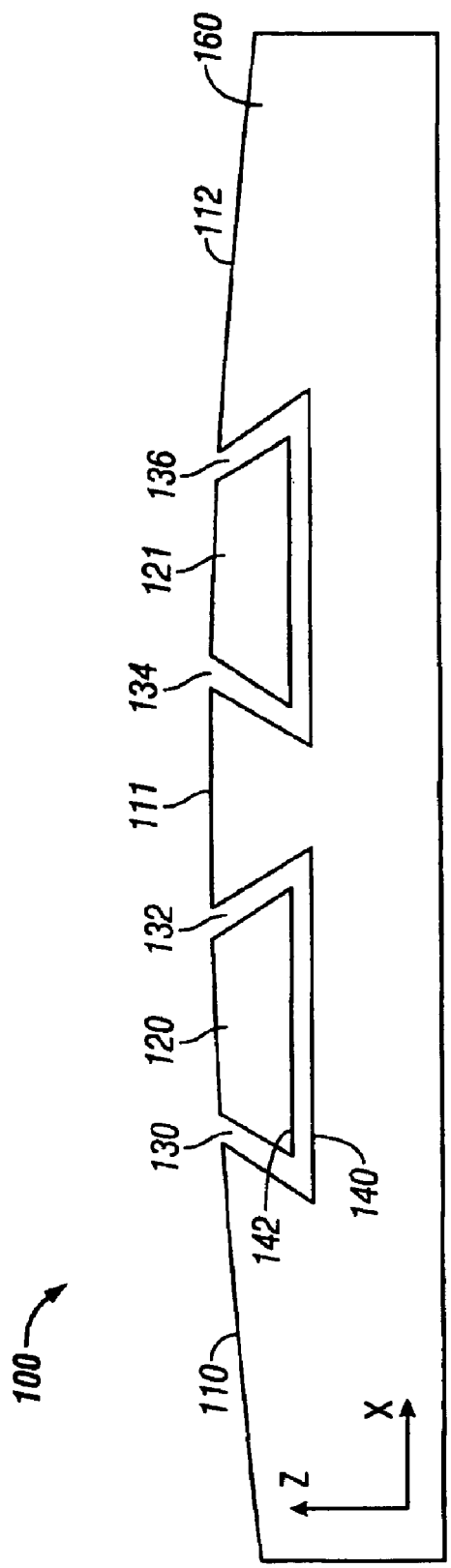
FIG. 3 depicts a cross sectional view of the tape head of the exemplary embodiment.

FIG. 3 depicts a cross sectional view of the tape head 100 of the exemplary embodiment taken in the X-Z plane. The body or block of the head 160, is comprised of a ferrite material, as is known in the art. In the present invention, microsliders 120 and 121 are disposed in channels (or cavities) within the head block, as shown. In one exemplary embodiment, the microsliders include a dovetail taper section 142 that mates with a taper 140 in block 160 to hold the microslider in the block. Alternatively, a tongue-and-groove arrangement can be provided.

An additional advantage of the use of MEMS technology in the tape head 100 of the present invention is that the tape contact surface can be manufactured so that the contour is generally flat. U.S. Pat. No. 5,905,613 describes a tape head having a flat contour, and is hereby incorporated by reference in its entirety. Flat head technology greatly reduces the angle of wrap THETA of the tape over the head. The normal force in the −Z direction exerted on the head by the tape is $2*T*\sin(\text{THETA}/2)$, where T is the tension in the tape. Since wrap angle THETA is typically small enough such that the small-angle trigonometry approximation for the sine function can be used, the normal force is equal to T*THETA. This means that the normal force exerted by the tape on the head is directly proportional to the wrap angle. Thus, reducing the wrap angle reduces the normal force, which lessens the power requirements of micromotors 130–131. The scale of the microslider 120/121 may be on the order of <1 mm wide, and long enough to include the desired number of elements thereon. Thus, the channel (cavity) formed in the head has a corresponding width, inclusive of manufacturing tolerances.

Microsliders 120 and 121 can include significantly smaller cable technologies, such as optical fiber cables to communicate data input and output of the read/write and servo elements to the block 160 of the head. Also, since the head element depicted in FIG. 1 is manufactured using MEMS technology, certain portions of the data electronics (e.g., pre-amp circuitry) can be incorporated directly on head block 160. Once amplified, data and servo signals could use conventionally built cables to communicate information to controller 206. Communication between microsliders 120 and 121 and the main body of the head could alternatively be accomplished using lasers, RF communication, or other wireless data transfer methodology known in the art.

It will be understood to those skilled in the art that micromotors 130 and 131 are depicted in FIG. 1 as comprising rotary-type motors. However, microsliders 120 and 121 could similarly be moved in the Y direction by linear stepper motors in which the microsliders themselves could comprise the moving portion of the linear motor. In such a construction, the step resolution for the linear motor would be designed to be within the resolution of the fine seek movement.

The use of MEMS technology for microsliders 120 and 121 in the exemplary embodiment of the present invention, has additional advantages in addition to the manufacturing advantages described above. For example, the low mass of the microsliders permits high frequency control of these sliders in the +/−Y direction to closely follow the tape's lateral guiding motion. For example, in IBM's 3590 and LTO tape programs, the tape's lateral guiding motion is on the order of 25 microns, so that the fine seek motion required by the microsliders is small, thereby easing the design consideration for the cables between the microsliders and the main body of the head, and reducing the overall inertia during fine seek movement.

Those skilled in the art will recognize numerous modifications to the present invention, for example, the read, write and servo elements may be nitride coated for better wear durability. Other modifications may be made. For example, although the coupling between the micromotors and the microsliders is preferably by way of a rack and pinion engagement, alternate means could include a gear-train, friction driver and/or screw drive mechanism as are well understood in the art (indeed all such translation mechanisms are deemed equivalent herein). The head depicted in FIG. 1 includes two microsliders 120 and 121 for translating a plurality of read, write and servo elements in the +/−Y direction. However, it may be desirable to have more than one microslider in each taper 140, to permit more data I/O, which increases performance. Alternatively, it may be desirable to modify the head of FIG. 1 such that a read write pair is independently controlled. Yet another alternate embodiment would entail the read-write pairs of elements being on the same microslider.

Still other modifications can be made. For example, the tape head 100 described herein has a generally planar tape contact surface. However, the tape head could be formed as a right circular cylinder block or the right circular cylinder of a helical scan tape head, such as used in a conventional VCR (Video Cassette Recorder). In still other modifications, the microsliders and micromotors can be mounted on the surface of the tape head, instead of in the cavities described herein. In such an embodiment, the tape head may comprise tracks disposed thereon in which the microsliders are movably held above the surface of the head. Alternatively, the microsliders can be partially disposed in a channel or cavity. All such modifications are deemed within the spirit and scope of the present invention, only as limited by the appended claims.

What is claimed is:

1. A tape head, comprising:
   a body portion comprising a cavity;
   a microslider movably disposed in said cavity and constrained by walls of a head block, said microslider comprising at least one read element disposed thereon; and
   a controllable micromotor coupled to said microslider for moving said microslider in said cavity.

2. A tape head system, comprising:
   a body portion comprising a cavity;
   a microslider movably disposed in said cavity comprising at least one read or write element disposed thereon, wherein said cavity comprises a tapered cavity and said microslider having a mated taper, wherein said microslider moves in a linear fashion within said cavity;
   a micromotor coupled to said microslider for moving said microslider in said cavity; and
   a controller for actuating said micromotor to move said microslider.

3. A tape head system as claimed in claim 2, wherein said body portion comprising ferrite material.

4. A tape head system as claimed in claim 2, further comprising an independent fine position sensor to determine the position of said read or write element with respect to a tape and generating a signal indicative of said position to said controller, wherein said controller controlling said micromotor to move said microslider transverse to the direction of said tape movement in response to said position signal.

5. A tape head system as claimed in claim 2, further comprising an independent coarse position sensor to determine the position of said read or write element with respect to a tape and generating a signal indicative of said position to said controller, wherein said controller controlling moving said body transverse to the direction of said tape movement in response to said position signal.

6. A tape system as claimed in claim 2, wherein said micromotor comprises a rotary motor coupled to said microslider via a gear.

7. A tape system as claimed in claim 2, wherein said micromotor comprises a linear motor.

8. A tape system as claimed in claim 2, wherein said cavity comprises a tapered dovetail cavity and said microslider having a mated dovetail taper, wherein said microslider moves in a linear fashion within said cavity.

9. A tape system as claimed in claim 2, wherein said microslider further comprising a servo element disposed thereon, said servo element reading servo position data on a tape.

10. A tape head, comprising:
    a body portion comprising a first and second cavity formed on a surface thereof;
    a first microslider movably disposed in said first cavity and a second microslider movably disposed in said second cavity, said first and second microsliders each comprising at least one read element disposed thereon; and
    a first controllable micromotor coupled to said first microslider for moving said first microslider in said first cavity and a second controllable micromotor coupled to said second microslider for moving said second microslider in said second cavity.

11. A tape head as claimed in claim 10, further comprising a write element and a servo element disposed on both said first and second microsliders.

12. A tape head as claimed in claim 10, wherein said first and second microsliders being disposed in parallel relation to one another.

13. A tape head as claimed in claim 10, wherein said first and second micromotors are independently controllable.

14. A tape head as claimed in claim 10, wherein said cavities having a tapered dovetail shape cavity and said microsliders having a mated taper, wherein said microsliders move in a linear fashion within said cavities.

15. A tape head system, comprising:
    a body portion comprising a first and second cavity;
    a first microslider movably disposed in said first cavity and a second microslider movably disposed in said second cavity, said first and second microsliders each comprising at least one read element disposed thereon; and
    a first controllable micromotor coupled to said first microslider for moving said first microslider in said first cavity and a second controllable micromotor coupled to said second microslider for moving said second microslider in said second cavity:
    a controller for actuating said micromotors to move said microsliders.

16. A tape head system as claimed in claim 15, further comprising an independent fine position sensor to determine the position of said read element with respect to a tape and generating a signal indicative of said position to said controller, wherein said controller controlling said micromotor to move said microslider transverse to the direction of said tape movement in response to said position signal.

17. A tape head system as claimed in claim 15, further comprising an independent coarse position sensor to determine the position of said read element with respect to a tape and generating a signal indicative of said position to said controller, wherein said controller controlling moving said body transverse to the direction of said tape movement in response to said position signal.

18. A tape head system as claimed in claim 15, wherein said first and second micromotors each comprise a rotary motor coupled to said microsliders via a gear.

19. A tape head system as claimed in claim 15, wherein said cavities each comprise a tapered dovetail cavity and each said microslider having a mated taper, wherein said microsliders move in a linear fashion within said cavities.

20. A tape head system as claimed in claim 15, wherein each said microslider further comprising a servo element disposed thereon, said servo element reading servo position data on a tape.

21. A tape system as claimed in claim 15, wherein said first and second micromotors being controlled independently by said controller.

22. A tape head, comprising:
   a body portion formed of ferromagnetic material;
   a microslider movably disposed on said body portion and constrained by walls of a head block, said microslider comprising at least one read element disposed thereon; and
   a controllable micromotor coupled to said microslider for moving said microslider independently of said body portion.

23. A tape head system, comprising:
   a body portion comprising a microslider movably disposed thereon, said microslider constrained by walls of a head block, said microslider comprising at least one read or write element disposed thereon;
   a micromotor coupled to said microslider for moving said microslider; and
   a controller for actuating said micromotor to move said microslider.

24. A tape head, comprising:
   a body portion formed of ferromagnetic material;
   a microslider movably disposed on said body portion, said microslider constrained by walls of a head block, said microslider comprising at least one read element disposed thereon; and
   a controllable micromotor coupled to said microslider for moving said microslider.

25. A tape head system, comprising:
   a body portion comprising a first and second cavity;
   a first microslider movably disposed on said body portion and a second microslider movably disposed on said body portion, said first and second microsliders each comprising alternating read and write elements thereon;
   a first controllable micromotor coupled to said first microslider for moving said first microslider and a second controllable micromotor coupled to said second microslider for moving said second microslider; and
   a controller for actuating said micromotors to move said micro sliders.

* * * * *